(12) United States Patent
Wagner et al.

(10) Patent No.: US 7,752,252 B2
(45) Date of Patent: Jul. 6, 2010

(54) DE-FRAGMENTATION OF TRANSMISSION SEQUENCES

(75) Inventors: Matthias Wagner, Munich (DE); Robert Hirschfeld, Ilmenau (DE)

(73) Assignee: NTT DoCoMo, Inc., Tokyo (JP)

( * ) Notice: Subject to any disclaimer, the term of this patent is extended or adjusted under 35 U.S.C. 154(b) by 1305 days.

(21) Appl. No.: 10/514,977

(22) PCT Filed: May 17, 2002

(86) PCT No.: PCT/EP02/05494

§ 371 (c)(1),
(2), (4) Date: Aug. 9, 2005

(87) PCT Pub. No.: WO03/098900

PCT Pub. Date: Nov. 27, 2003

(65) Prior Publication Data

US 2006/0101042 A1    May 11, 2006

(51) Int. Cl.
*G06F 17/00* (2006.01)

(52) U.S. Cl. ............... 709/200; 709/232; 709/241; 709/246; 709/247; 707/101; 707/5

(58) Field of Classification Search ........... 709/200, 709/232, 241, 246, 247; 707/5, 101
See application file for complete search history.

(56) References Cited

U.S. PATENT DOCUMENTS

| | | | |
|---|---|---|---|
| 5,640,553 A * | 6/1997 | Schultz | 707/5 |
| 5,895,476 A | 4/1999 | Orr et al. | |
| 5,982,780 A * | 11/1999 | Bohm et al. | 370/450 |
| 6,192,382 B1 | 2/2001 | Lafer et al. | |
| 6,434,556 B1 * | 8/2002 | Levin et al. | 707/5 |
| 6,584,468 B1 * | 6/2003 | Gabriel et al. | 707/10 |
| 6,732,090 B2 * | 5/2004 | Shanahan et al. | 707/3 |
| 6,735,592 B1 * | 5/2004 | Neumann et al. | 707/101 |
| 6,868,525 B1 * | 3/2005 | Szabo | 715/738 |

(Continued)

FOREIGN PATENT DOCUMENTS

EP    0 813 159 B1    11/2004

(Continued)

OTHER PUBLICATIONS

Girardot, et al., "Efficient Representation and Streaming of XML Content Over the Internet Medium," IEEE, pp. 67-70 (2000).

(Continued)

*Primary Examiner*—Alina N. Boutah
(74) *Attorney, Agent, or Firm*—Nutter McClennen & Fish LLP; John J. Penny, Jr.

(57) ABSTRACT

The present invention aims at avoiding fragmentation during transmission of a structured document (10). This is achieved by a method of progressive transmission for a structured document (10), the structured document (10) comprising sub-documents (12, 14, 16, . . . ) with related relevance weightings. In particular, a fragmentation measure is determined according to the transmission sequence in an automatic manner using a formal expression of fragmentation. After comparison the fragmentation measure with a predetermined threshold value the transmission sequence is modified to reduce fragmentation when the fragmentation measure exceeds the threshold value.

12 Claims, 13 Drawing Sheets

U.S. PATENT DOCUMENTS

| | | | |
|---|---|---|---|
| 6,895,407 B2* | 5/2005 | Romer et al. | 707/104.1 |
| 7,028,024 B1* | 4/2006 | Kommers et al. | 707/3 |
| 7,181,438 B1* | 2/2007 | Szabo, Andrew | 707/2 |
| 7,246,131 B2* | 7/2007 | Lehmann et al. | 707/101 |
| 7,353,246 B1* | 4/2008 | Rosen et al. | 709/202 |
| 2001/0029427 A1* | 10/2001 | Nagaki et al. | 701/208 |
| 2002/0120619 A1* | 8/2002 | Marso et al. | 707/3 |
| 2003/0041177 A1* | 2/2003 | Warschko et al. | 709/310 |
| 2003/0061213 A1* | 3/2003 | Yu et al. | 707/7 |
| 2003/0099202 A1* | 5/2003 | Lear et al. | 370/238 |
| 2004/0107235 A1* | 6/2004 | Koskelainen | 709/200 |
| 2005/0022114 A1* | 1/2005 | Shanahan et al. | 715/513 |
| 2005/0066236 A1* | 3/2005 | Goeller et al. | 714/39 |

FOREIGN PATENT DOCUMENTS

| | | | |
|---|---|---|---|
| WO | WO-01/46813 A1 | 12/2000 |
| WO | WO 01/46813 A1 | 12/2000 |

OTHER PUBLICATIONS

Wagner, et al., "Progressive Content Delivery for Mobile E-Services," (2002).

Chinese Office Action dated Mar. 13, 2009.

Chinese Office Action dated Dec. 4, 2009.

* cited by examiner

|  | 3 | 4 | 5 | 7 | 8 | D' |
|---|---|---|---|---|---|---|
| ([7, 3, 4, 5, 8]) | 192 | 176 | 160 | 195 | 100 | [ ] |
| ([8, 3, 4, 5]) | 48 | 44 | 40 | 195 | 50 | [7] |
| ([3, 4, 5]) | 12 | 11 | 10 | 195 | 50 | [7, 8] |
| ([4, 5]) | 12 | 5.5 | 5 | 195 | 50 | [7, 8, 3] |
| ([5]) | 12 | 5.5 | 2.5 | 195 | 50 | [7, 8, 3, 4] |
| ([ ]) | 12 | 5.5 | 2.5 | 195 | 50 | [7, 8, 3, 4, 5] |

DE-FRAGMENTATION OF TRANSMISSION SEQUENCES

FIELD OF INVENTION

The present invention relates to a method of progressive transmission for a structured document and related de-fragmentation strategies applied to transmission sequences.

BACKGROUND ART

In WO01/46813 A1, there is described a communication system for downloading a structured document in which unit documents of the structured documents of related to one another hierarchically and are stored in a server device. A terminal device acquires and displays one of the structured documents. The server device and the terminal device are interconnected through a network to constitute a communication system. Further, the terminal device notifies the server device of the identifier of a document that the user gives an instruction to display. In view of this, the server device then sends the next document of the structured document for subsequent storage in the terminal device.

Further, in U.S. Pat. No. 5,895,476, there is described a design engine for automatic reformatting for design and media in support of automatic rendering multiple forms of media such as print.

In Girardot M. et al.: 'Efficient representation and streaming of XML content over the Internet medium', Multimedia And Expo, 2000, ICME 2000, 2000 IEEE International Conference On New York, N.Y., USA, 30 Jul.-2 Aug. 2000, Piscataway, N.J., USA, IEEE, U.S., 30 Jul. 2000, pages 67-70, XP010511404, ISBN: 0-7803-6536-4, there is described an efficient representation and streaming of XML content over the Internet medium.

Therefore, the further improvement of efficient web-enabled multimedia databases and middleware systems is a major topic in today's computer science research. The transmission and management of multimedia content differs essentially from handling numeric and character transmission data in communication systems and requires new strategies in handling multimedia data before transmission thereof.

This is particularly the case for so-called structured documents for which a transmission sequence is determined before transmission thereof. For structured documents it is assumed that related sub-documents have different hierarchy levels and that on each hierarchy level a partition and re-ordering of sub-documents may lead to severe fragmentations.

To explain this problem, further details of fragmentation will be explained in the following with respect to FIG. 1 to 4.

As shown in FIG. 1, a typical example of a structured document 10 comprises a plurality of sub-documents, e.g., a headline 12, a subtitle 14, an image 16 with a related caption 18, web-links 20 and different text sections 22, 24, 26, 28.

To improve transmission of such structured documents it has proven to be efficient to model the structure imposed on the structured document, e.g., using a tree-structure as shown in FIG. 2.

As shown in FIG. 2, the document as a whole is related to the root node. Further, the different sub-documents referred to above with FIG. 1 are modelled as nodes in the tree on lower levels of hierarchy. Here, one specific hierarchy level in the tree modelling a structured document will also be referred to as a level of detail node in the following.

A further concept applied to structured documents is relevance weighting. The main goal of relevance weighting is to provide an optimal transmission order for sub-documents during transmission, e.g., due to the possibly limited capacity in mobile communication environments like low band width.

Another example for the application of relevance weightings are end user interests where more relevant parts of structured documents should be delivered first. Therefore, relevance weightings are applied to identify content-bearing sub-documents, so that subsequently the document structure may be altered in a way that highly weighted sub-documents will be delivered first.

FIG. 3 shows the impact of relevance weightings on readability of documents after transmission thereof. The left figure of FIG. 3 is related to the natural reading sequence intended for natural reading of sub-documents, identified by the author of the structured document. Here, the abscissa identifies the number of sub-documents and the ordinate the related relevance weighting of each single sub-document. The right side of FIG. 3 shows the distribution of relevant weightings after reordering the sub-documents according to their relevance weighting.

As shown in FIG. 4 the simplistic application of relevance weightings to sub-documents before progressive transmission thereof may lead to a high grade of fragmentation of the structured documents as seen by the end user.

In particular, this is a problem for progressive transmission to a device having limited display capabilities, i.e., a mobile phone, a personal digital agent PDA, a portable computer, or a hybrid thereof. The display typically has a scroll bar 28 for triggering the display of the transmitted structured document. When scrolling the scroll bar from the upper side to the lower side, different parts of the transmitted structured document will be displayed to the user.

As shown in FIG. 4, relevance weightings may lead to a situation where, e.g., the image 18 shown in FIG. 1 is no longer displayed with the related head line. This fragmentation of the structured document leads to a significant decrease in perceivability after progressive transmission.

SUMMARY OF INVENTION

In view of the above, an object of the invention is to avoid fragmentation during transmission of a structured document.

A further object of the present invention is, to provide strategies for de-fragmenting a structured document after re-ordering thereof according to relevance weightings.

According to a first aspect of the invention as defined in claim 1, these objects are achieved through a method of progressive transmission for a structured document. The structured document comprises sub-documents with related relevance weightings. Without restricting the scope of the invention, it may be assumed that a transmission sequence for the sub-documents is generated according to relevance weightings.

According to the present invention it is proposed for the first time to modify the transmission sequence derived according to relevance weightings to improve perceivability for an end user after display of the structured document.

Heretofore, it is proposed to use a formal representation of fragmentation which forms the basis of automation of the de-fragmentation process.

Once a formal measure of fragmentation is available it may then be compared with a threshold value. As soon as fragmentation exceeds the threshold, a de-fragmentation strategy may then be applied to the preliminary transmission sequence. It is important to note that the present invention is not restricted to a particular type of de-fragmentation strategy.

According to a preferred embodiment, sub-documents of the structured document are modelled as nodes of an ordered tree, the number of sub-documents being k, and progressive transmission is achieved on a level of detail of the tree selected for document transmission.

According to the preferred embodiments outlined above it is possible to apply easily different levels of abstraction of the structured document contents before transmission thereof. The lower the level of detail in the tree selected for document transmission, the more detailed the information provided to the end user will be. Therefore, in particular for lower levels of detail for document transmission the de-fragmentation strategies explained in the following are of particular relevance.

According to another preferred embodiment, a reading sequence according to an intended reading ordering of sub-documents is an ordered set of nodes on the level of detail of the tree $R=[r_1, \ldots, r_k]$, the transmission sequence for progressive transmission is an ordered set of nodes on a level of detail of the tree $D=[d_1, \ldots, d_k]$, and the fragmentation measure is determined using a permutation vector $\pi: \{1, \ldots, k\} \rightarrow \{1, \ldots, k\}$ defined according to $\pi(i)=j$, with $r_i=d_j$ for i, j$\in\{1, \ldots, k\}$.

This preferred embodiment is related to a formalized approach to the representation of reading sequences and transmission sequences. Further, it relates to the application of a permutation vector onto such sequences as a pre-requisite for applying the formal measure of fragmentation to different de-fragmentation strategies.

According to another preferred embodiment, the fragmentation measure is an absolute fragmentation measure defining the sum of distances of sub-components from their original position in the reading vector.

The advantage of this preferred embodiment is that the fragmentation measure may easily be determined simply through one scan of the permutation vector as outlined above. Further, it gives an indication on necessary de-fragmentation of sub-documents before transmission thereof.

According to another preferred embodiment, the fragmentation measure is a ratio of incoherence measuring how far absolute positions of nodes in the reading sequence are changed after generation of the transmission sequence.

The perception of the end user is improved if those sub-documents which have originally been arranged adjacent or again arranged adjacent after transmission of the structured document, i.e. with a low degree of incoherence. Therefore, this ratio of incoherence as fragmentation measure has the advantage that it is directly related to the perception of the end user.

According to another preferred embodiment, the fragmentation measure is a readability measure expressing how many nodes in the transmission sequence are still in the order according to the reading sequence.

This measure of fragmentation has the advantage that it gives an indication of the absolute number of sub-documents which maintain the reading sequence also after transmission.

Preferably, the different fragmentation measures may be normalized.

The normalization of the different fragmentation measures is advantageous in that the fragmentation measure becomes independent of the document size.

According to another preferred embodiment of the present invention, sub-documents comprise data defined according to the document model for a specific application.

This preferred embodiment of the present invention allows to achieve de-fragmentation of structured documents designed for any kind of application. In other words, the different concepts of measuring de-fragmentation and related de-fragmentation strategies may be applied to any type of application. Typical examples for sub-documents, which, however, are not to be construed at limiting the present invention, are head line, author, title, image, photo, and/or text sub-documents.

According to another preferred embodiment of the present invention, progressive transmission is achieved to a mobile device, e.g., a mobile telephone, a personal digital agent, a portable computer or any type of hybrid device.

Therefore, the present invention may be adapted to any type of transmission irrespective of the transmission target. The application of the present invention is of particular advantage when the transmission target has limited display capabilities, which, without loss of generality, may be assumed for typical examples for mobile devices such as mobile telephone, personal digital agents PDAs, portable computers or any type of hybrid device.

According to another embodiment of the present invention, structured documents are submitted for progressive transmission with a markup language selected from a group comprising WAP, HTML, cHTML, or XML.

This preferred embodiment of the present invention is related to typical application scenarios of the present invention, however, without limiting the scope thereof. E.g., HTML may be well suited for internet applications. WAP is applicable to the transmission of structured documents in GSM to mobile devices. A further example is the application of cHTML which may form a basis for application of the method of transmitting structured documents within imode applications, e.g., within IMT 2000. Further, imode structured document transmission may also be based on generic XML formats and generic XML documents.

According to another embodiment of the present invention, progressive transmission is achieved via a connection provided according to a standard selected from a group comprising GSM, PDC, GPRS, PPP, HSCSD, WLAN, HiperLAN, IrDa, Bluetooth, IS 45, IS 95, IMT 2000.

This preferred embodiment of the present invention is particularly suited for mobile communication applications and delivery of structured documents to mobile devices. Here, GSM, PDC, GPRS, IS 45, HSCSD, are standards underlying the mobile communication. The same applies to IS 95 and IMT 2000 for wideband CDMA.

However, the present invention is as well applicable to wireless local area network applications such as WLAN, HiperLAN.

Further examples of the transmission of structured documents to end user devices on the basis of mobile communication are infrared transmission according to IrDa or short range mobile communication using the Bluetooth standard.

Irrespective of the kind of device which receives document data and the different embodiments outlined above, the present invention is particularly suited for application of the client/server architecture where, e.g., the method of progressive transmission would be applied at the server side, e.g., a content delivery server.

According to a further aspect as defined in claim 18, the present invention relates to a method of de-fragmenting a transmission sequence to transmit a structured document. The structured document comprises sub-documents being modelled as nodes of a tree. Context linkages between different sub-documents are modelled as edges of the tree, and the transmission sequence is modelled as an ordered set of nodes on a level of detail of the tree selected for document transmission, The method determines the total number of nodes in the tree and adjusts the relevance weighting for each node on the level of detail as a function of a node number.

In the most general sense, the function of the node number is a decreasing function according to the order of the node being processed, e.g., the node number.

This first strategy for de-fragmentation allows to reduce document fragmentation according to a preliminary transmission sequence having regard to the overall structural characteristics of structured documents.

In particular, the first de-fragmentation strategy allows to consider the natural intended reading sequence to achieve de-fragmentation.

Of particular advantage is the application of this first de-fragmentation strategy to mobile environments.

Due to restricted band width and capabilities of mobile devices the level of detail for the delivery of sub-documents is often chosen low. However, the lower the level detail, the higher the risk of heavy fragmentation. This is one reason, why the de-fragmentation strategy outlined above is of particular advantage.

According to another preferred embodiment, in the de-fragmentation method the tree is traversed in prefix order to assign a node number to each node in the tree.

This preferred embodiment of the present invention is based on the assumption that sub-documents in the structured document have a hierarchy implied. Therefore high levels in the tree represent less detailed information than the lower levels in the tree. The relevance of information is then reflected by the number of the related nodes in the tree.

It is therefore natural to use this information of relevance for amendment of relevance weightings of sub-documents. Once, relevance weightings of the different nodes have been adjusted or equivalently modified the preliminary transmission sequence may be amended corresponding to the amended relevant weightings.

According to an another preferred embodiment of the de-fragmentation method the relevance weighting for each node is adjusted when traversing the tree in prefix order to assign a node number to each node in the tree.

This preferred embodiment of the present invention has the advantage that it requires only one traversal of the tree, both, for assigning the node number and also for adjusting the relevance weighting of each node. This decreases complexity of the de-fragmentation procedure.

According to a preferred embodiment, relevance weightings for nodes are adjusted in indirect proportion to the number of the node, e.g., with a factor defined as the total number of nodes in the tree divided by the number of the node.

This preferred embodiment of the present invention is related to the fact that intuitively the relevance weighting of nodes on higher levels of the tree should be raised more than the relevance weighting of nodes on lower levels of hierarchy of the tree being related to more detailed information.

According to a further aspect of the present invention as defined in claim 24, there is proposed a second method of de-fragmenting a transmission sequence to transmit a structured document. The structured document comprises sub-documents with related relevance weightings being modelled as nodes of a graph. The context linkages between different sub-documents are modelled as arcs of the graph, and the transmission sequence being modelled as an ordered set of nodes. In a first step the node with highest relevance weighting is selected as next node of a de-fragmented transmission sequence. Then in a second step a distance measure from the selected node to nodes of the transmission sequence which are not assigned to the de-fragmented transmission sequence is determined using the graph modelling of the structured document and shortest path metrics. In a third step relevance weightings for nodes which are not assigned to the de-fragmented transmission sequence are adjusted as a function of the related distance measure. The first to third step are then recursively repeated until all nodes of the transmission sequence are processed.

The first de-fragmentation method outlined above considers a reading sequence of a structured document. Supplement hereto, this second de-fragmentation method is not restricted to a single level of hierarchy in a tree but allows to generalize the concept to a general graph or to several levels of hierarchy in a tree.

In particular, an adjustment of relevance weightings is carried out multiple times to even more accurately use structural information available to describe a document.

According to a preferred embodiment relevance weightings for nodes which are not assigned to the de-fragmented transmission sequence are adjusted in indirect proportion to the related distance measure, e.g., by dividing the relevance weighting of the node through the distance measure to the selected node.

This preferred embodiment of the invention allows for appropriate selection of the next node during recursive processing of the transmission sequence. According to the selection of the next node, distances from this node will then be determined to those elements of the transmission sequence which have not been processed so far.

A first advantage is the flexible selection of the next node according to the highest relevance weighting, which may have been modified previously during de-fragmentation.

A second advantage is the re-calculation of relevance weightings to achieve the most appropriate picture of sub-document context at the relevant stages of the recursive de-fragmentation process.

Overall, this further de-fragmentation method according to the present invention allows for a dynamic adaptation of relevance weightings.

According to another preferred embodiment of the present invention there is provided a computer program product directly loadable into the internal memory of a content delivery device comprising software code portions for performing the inventive progressive transmission and de-fragmenting steps when the product is run on a processor of the content delivery device. Preferably, the content delivery device may be a content delivery server or a content delivery portable computing device.

Therefore, the present invention is also provided to achieve an implementation of the inventive method steps on computer or processor systems. In conclusion, such implementation leads to the provision of computer program products for use with a computer system or more specifically a processor operated in, e.g., a mobile communication environment.

This programs defining the functions of the present invention can be delivered to a computer/processor in many forms, including, but not limited to information permanently stored on non-writable storage media, e.g., read only memory devices such as ROM or CD ROM discs readable by processors or computer I/O attachments; information stored on writable storage media, i.e. floppy discs and harddrives; or information convey to a computer/processor through communication media such as network and/or and/or Internet and/or telephone networks via modems or other interface devices. It should be understood that such media, when carrying processor readable instructions implementing the inventive concept represent alternate embodiments of the present invention.

DESCRIPTION OF DRAWING

Preferred embodiments of the present invention will be described in the following with reference to the drawings in which

Figure 4:
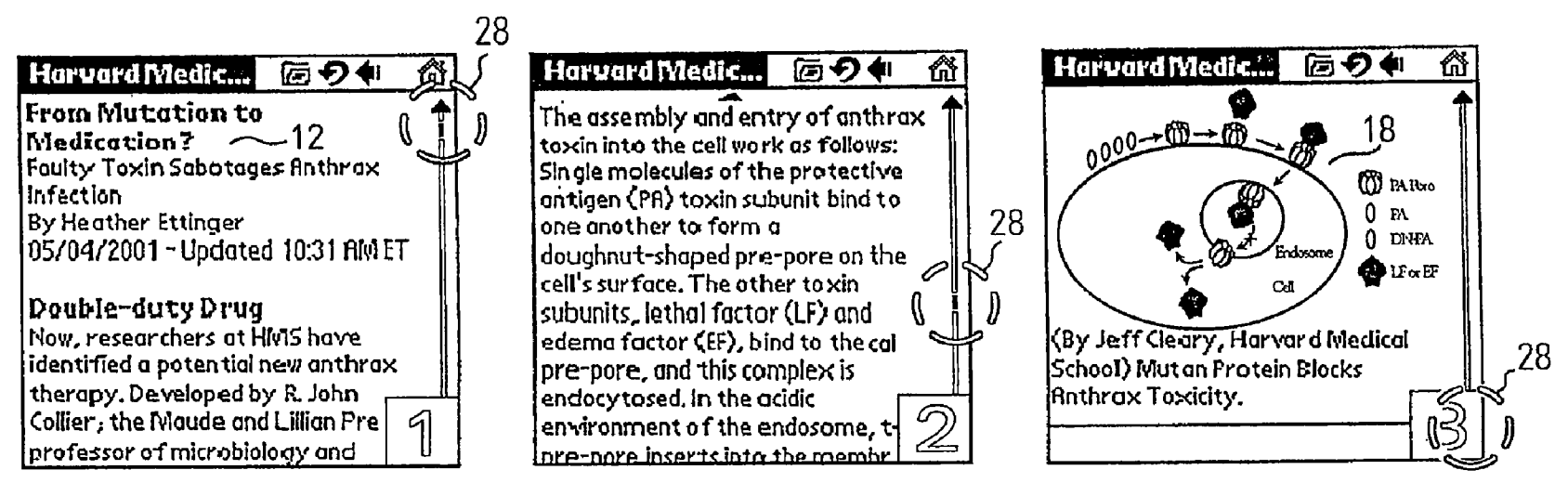

FIG. 4 shows the impact of fragmentation after re-ordering the structured document in compliance with the weighting on the display of the structured document;

FIG. 10 shows an recursion of de-fragmentation according to the example shown in FIG. 9;

DESCRIPTION OF PREFERRED EMBODIMENTS

Figures 1, 2:
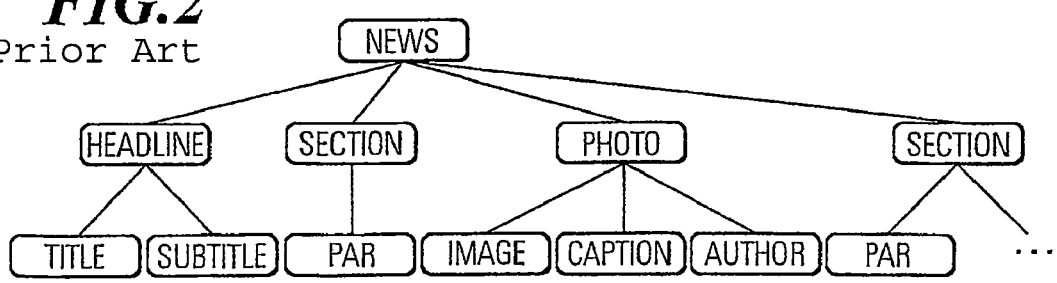
FIG. 1 shows an example for a structured document and the sub-documents forming part thereof.
FIG. 2 shows a modelling of the structured document using a tree model.
Figure 3:
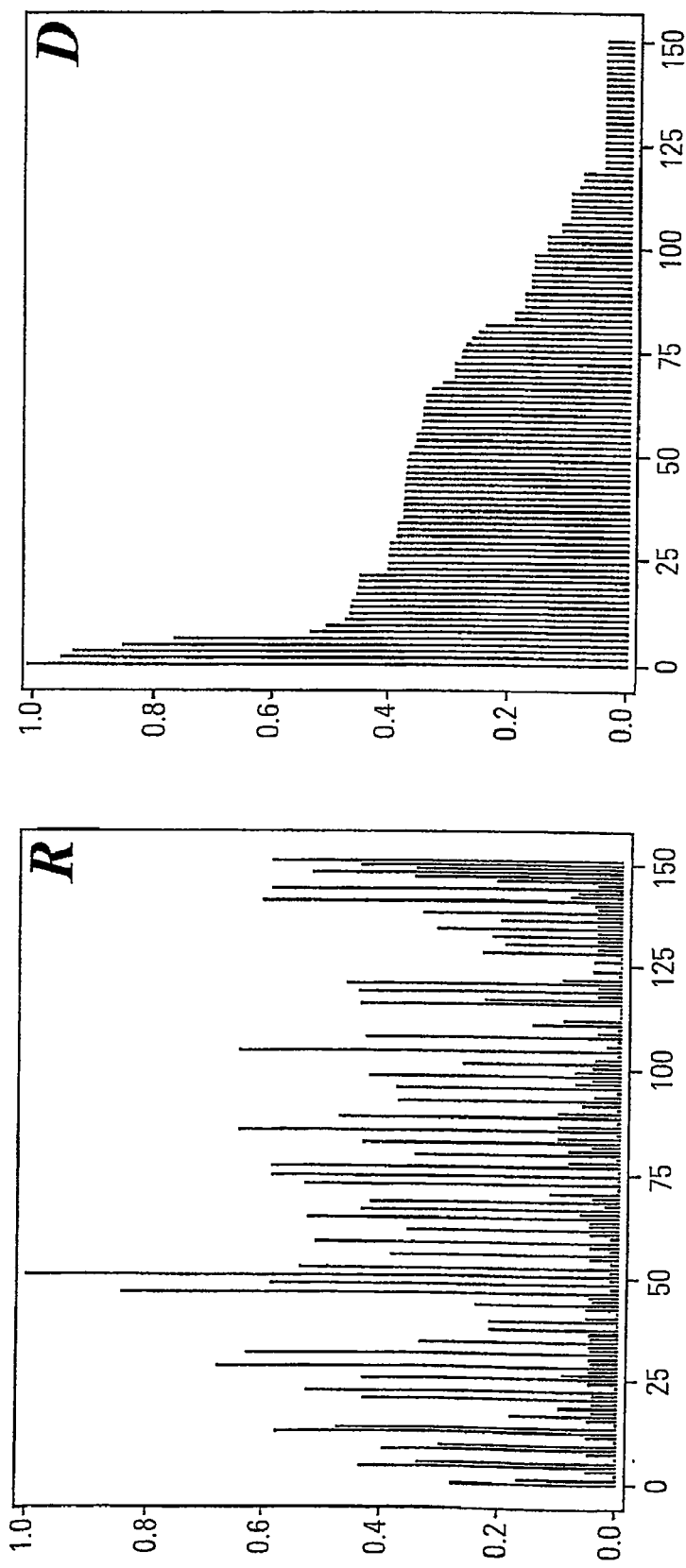
FIG. 3 shows a distribution of relevance weightings in a structured document according to a natural reading sequence and a distribution after re-ordering in compliance with relevance weighting.

In the following preferred embodiments of the invention will be described with reference to the drawing.

Heretofore, different formal expressions for measuring document fragmentation be will explained in the beginning. Then the application of such formal expressions within a method for progressive transmission will be described with reference to FIGS. 5 and 6.

Hereafter different de-fragmentation methods according to the present invention will be described with reference to FIG. 7 to 13, followed by a discussion of results with respect to FIGS. 14 and 15.

As outlined above, one way to represent structured documents is a tree model where the number of sub-documents in the structured document is k. Optionally, progressive transmission is achieved with respect to one level of hierarchy in the tree selected for document transmission referred to as level of detailed in the following.

Using this notation, a reading sequence according to an intended reading ordering of sub-documents is an ordered set of nodes on the level of detail in the tree:

$$R = [r_1, \ldots, r_k],$$

Further, the transmission sequence for progressive transmission is an ordered set of nodes on the level of detail of the tree according to $$D = [d_1, \ldots, d_k],$$

A basis for determination of the fragmentation measure is the use of a permutation vector $$\pi: \{1, \ldots, k\} \to \{1, \ldots, k\}$$

defined according to $$\pi(i) = j, \text{ with } r_i = d_j \text{ for } i, j \in \{1, \ldots, k\}.$$

A first example for a fragmentation measure is an absolute fragmentation measure defining the sum of distances of sub-components from their original positions in the reading sequence according to $$F_{abs} = \sum_{i=1}^{k} |\pi(i) - i|.$$

An estimate for an upper bound of this absolute fragmentation measure is $$F_{abs} \leq \frac{(k-1)^2}{2}.$$

This upper bound may be achieved to define a normalized absolute fragmentation method, being independent from document length, according to $$F_{rel} = \frac{2}{(k-1)^2} F_{abs}.$$

Another example for a fragmentation measure is a ratio of incoherence measuring how far absolute positions of nodes in the reading sequence are changed after generation of the transmission sequence. The ratio of incoherence is defined according to $$Z_{abs} = \sum_{i=1}^{k-1} |\pi(i+1) - \pi(i)|$$

An upper bound of this ratio of incoherence may be estimated to $$Z_{abs} \leq \frac{k \cdot (k-1)}{2}$$

Again, this upper bound may be used to determine a normalized ratio of incoherence being independent of document length according to $$Z_{rel} = \frac{2}{k \cdot (k-1)} \cdot (Z_{abs} - (k-1)).$$

Yet another example for a fragmentation measure is a readability measure expressing how many nodes in the transmission sequence are still in the order according to the initial reading sequence after applying the initial relevance weightings according to $$S_{abs} = \sum_{i=1}^{k-1} \left\{ \begin{array}{ll} 1, & \text{if } \pi(i+1) - \pi(i) = 1 \\ 0, & \text{otherwise} \end{array} \right\}.$$

Again, this fragmentation measure may be normalized to avoid dependency on document length according to $$S_{rel} = \frac{1}{k-1} \cdot S_{abs}$$

In the following, it will be explained how such formal expressions of document fragmentation may be applied in a transmission apparatus for progressive transmission according to the present invention.

Figure 5:
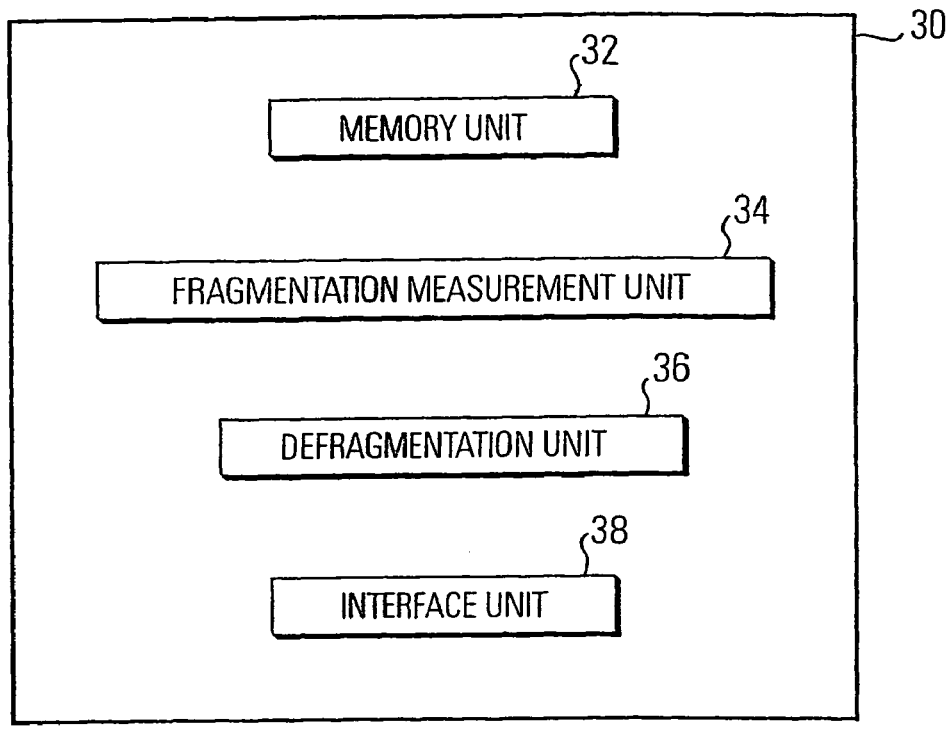
FIG. 5 shows a schematic diagram of a transmission apparatus according to the present invention.

As shown in FIG. 5, the transmission apparatus 30 comprises a memory unit 32 adapted to store the structured document with sub-documents and related relevance weightings and further a transmission sequence for the sub-documents.

As shown in FIG. 5, the transmission apparatus 30 further comprises a fragmentation measurement unit 34 adapted to use one of the formal expressions of fragmentation outlined above for a measurement of fragmentation in a transmission sequence, once relevant relevance weightings have been applied to re-order sub-documents and the preliminary transmission sequence has been adapted accordingly.

As shown in FIG. 5, the transmission apparatus 30 further comprises a de-fragmentation unit 36 adapted to compare the determined fragmentation measure with a threshold value and further adapted to apply a de-fragmentation strategy when the fragmentation measure exceeds the threshold value.

As shown in FIG. 5, the transmission apparatus 30 further comprises an interface unit 38 adapted to exchange of transmission data, i.e. either to receive a preliminary transmission sequence and related structured document information or to forward the structured document to the end user when the transmission sequence is determined.

Figure 6:
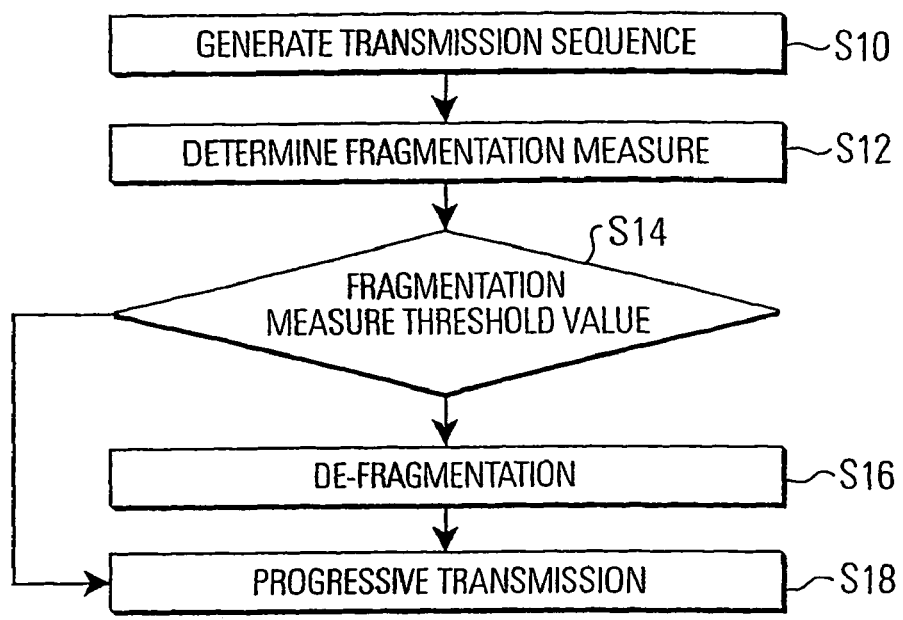
FIG. 6 shows a flowchart of a method for progressive transmission according to the present invention.

The operation of the transmission apparatus shown in FIG. 5 will be explained with reference to the flow chart shown in FIG. 6. FIG. 6 shows a flowchart according to operation of the transmission apparatus shown in FIG. 5.

As shown in FIG. 6 in a step S10 there is generated a transmission sequence as starting point for the method of progressive transmission according to the present invention. Alternatively, this transmission sequence may be provided as input to the method of progressive transmission.

Then, in a step S12, the different formal expressions of fragmentations are used to determine a fragmentation measure. It should be noted, that such a formalization is the basis for the determination of the fragmentation measure in an automatic manner. It is also the basis for the application of de-fragmentation methods according to the present invention to be discussed in more detail in the following with reference to FIG. 7 to 12.

As shown in FIG. 6, in a step S14 the determined fragmentation measure is compared to a threshold value. If the threshold value exceeded, a de-fragmentation strategy is applied in step S16 before progressive transmission in step S18. Otherwise, the method will directly proceed from the interrogation step S14 to step 18 for progressive transmission.

In the following, further details of de-fragmentation according to the present invention will be explained with respect to FIG. 7 to 12. In particular, FIGS. 7 and 8 relate to a first de-fragmentation method according to the present invention, and FIG. 9 to 12 relate to a second de-fragmentation method according to the present invention.

Figure 7:
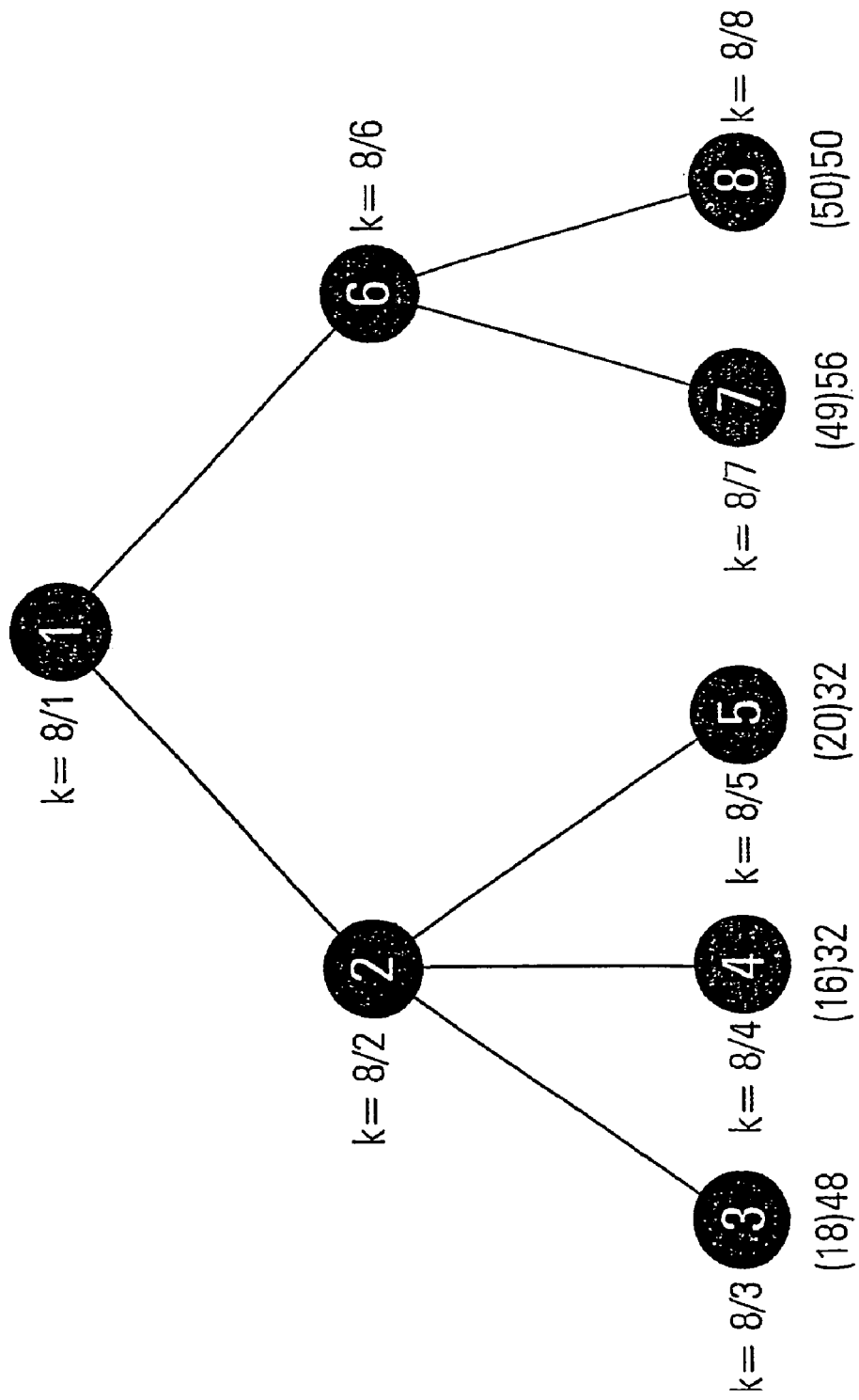
FIG. 7 shows an example of a first de-fragmentation strategy according of the present invention.

FIG. 7 shows an example for the application of the first de-fragmentation method according to the present invention.

For the example shown in FIG. 7 it is assumed that the structured document comprises sub-components being modelled as nodes 1, ..., 8 of a tree. Context linkages between different sub-documents are modelled as edges of the tree, and the transmission sequence is modelled as an ordered set of nodes on a level of detail, e.g., node 2 and 6 or node 3, 4, 5, 7, 8, of the tree which is selected for document transmission.

As shown in FIG. 7, initially there is determined the total number of nodes in the tree, which for the example is 8.

Further, each node in the tree has assigned a node number 1, ..., 8 according in a prefix order. A first option is that the document related data contains this information. A second option is that the node numbers are assigned during a prefix order traversal of the tree.

Once the total number of nodes in the tree and a node numbering is available, it is possible to adjust the relevance weighting for each node, and therefore also for each sub-document, on the level of detail selected for document transmission as a function of the node number.

Once such example for a function is that relevance weightings are adjusted in indirect proportion to the number of the node, e.g., for each node according to total number of nodes in the tree divided by the related node number.

Assuming that the level of detail for the example shown in FIG. 7 is 2, the initial relevance weightings would be updated from 18, 16, 20, 49, 50, respectively, to 48, 32, 32, 56, 50, respectively.

According to a generalization of the example shown in FIG. 7, one could consider a real number a divided by the node number.

From the example given above it may be understood that the adjustment of relevance weightings requires a traversal of the tree. According to the present invention where node numbers are provided for nodes through traversing the tree, already during this traversal of the tree simultaneously relevance weightings may be adjusted in the sense outlined above to reduce complexity.

Figure 8:
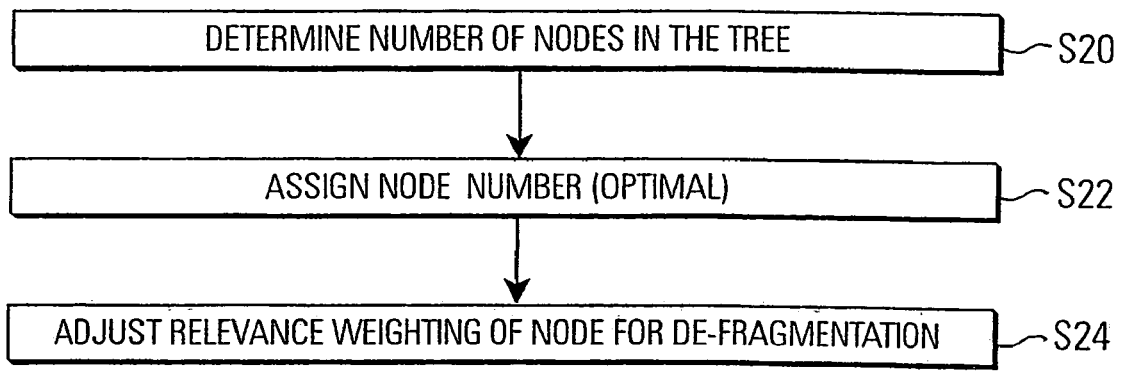
FIG. 8 shows a flowchart for a first de-fragmentation method according to the present invention.

FIG. 8 shows a flowchart representation of the fragmentation method illustrated with respect to FIG. 7.

As shown in FIG. 8, in the first step S20 the total number of nodes in the tree is determined. In a second step S22, a node number is assigned to each node in the tree, where step S22 is optional when the related data is already available from the information regarding the structured document. Then, in step S24 the relevance weightings of nodes in the trees are adjusted for de-fragmentation.

In the following, a procedural representation for traversing the tree in prefix orders and a related modification of relevance weightings of nodes in the tree will be given using a pseudo code representation.

A first procedure is the procedure prefix having the following representation:

```
1.  procedure prefix (n:Node, p:N):N
2.  Begin
3.     pos(n) := p; last := p;
4.     chldrn := children (n);
```

```
5.    while (chldrn <> [ ] ) do
6.        last := prefix (head(chldrn), last + 1);
7.        chldrn : = tail (chldrn);
8.    end
9.    return last;
10. End
```

The procedure prefix receives a list of nodes and the initial number for the root node, e.g., a value of one. According to line 1 and 6, the procedure prefix is recursively applied to traverse the tree in prefix order.

To achieve this, at every initialization of the procedure prefix, to each node there will assigned a node number, referred to as pos in line 3, and its value is memorized in a variable last.

Also, there is set up a list of children as list of children of the current node, line 4. While this list is a non-empty list, the procedure prefix will be recursively applied to the elements of the list, line 6, this time using the list of children and an incremented number node (last+1) as calling parameters.

To traverse the different levels of hierarchy of the tree down to the leaf nodes, the list of children is modified to the tail of this list, line 7. For each call of the procedure prefix the last number assigned to a node during a traversal of the sub-tree is returned, line 9.

In the following, there will be explained a modified procedure S-ORDER which also allows to modify relevance weightings of nodes at the same time when assigning node numbers to the nodes of the tree. The pseudo code representation thereof is

```
1.    procedure S-ORDER (n:Node, p:N):N
2.    Begin
3.        pos(n) := p; last := p;
4.        v(n) := (total/pos(n))*v(n);
5.        chldrn := children (n);
6.        while (chldrn <> [ ] ) do
7.            last := S-ORDER (head(chldrn), last + 1);
8.            chldrn : = tail (chldrn);
9.        end
10.       return last;
11. End
```

Here, an additional command is added, line 4, to modify the weight of a node. The modification is achieved by multiplying an initial relevance weighting with the total number of nodes in the tree and then dividing it by the node number assigned to the node. It is should that this is an non-limiting example only and that any type of relevance weighting update is applicable in the procedure S-ORDER.

The further steps of the modified procedure prefix are the same as outlined above.

The advantage of the procedure S-ORDER is that only one traversal of the tree is necessary when node numbers are not input to the method of de-fragmentation outlined above, thus reducing complexity.

In the following, a further embodiment for the de-fragmentation method according to the present invention will be explained with reference to FIGS. 9 to 12.

Figure 9:
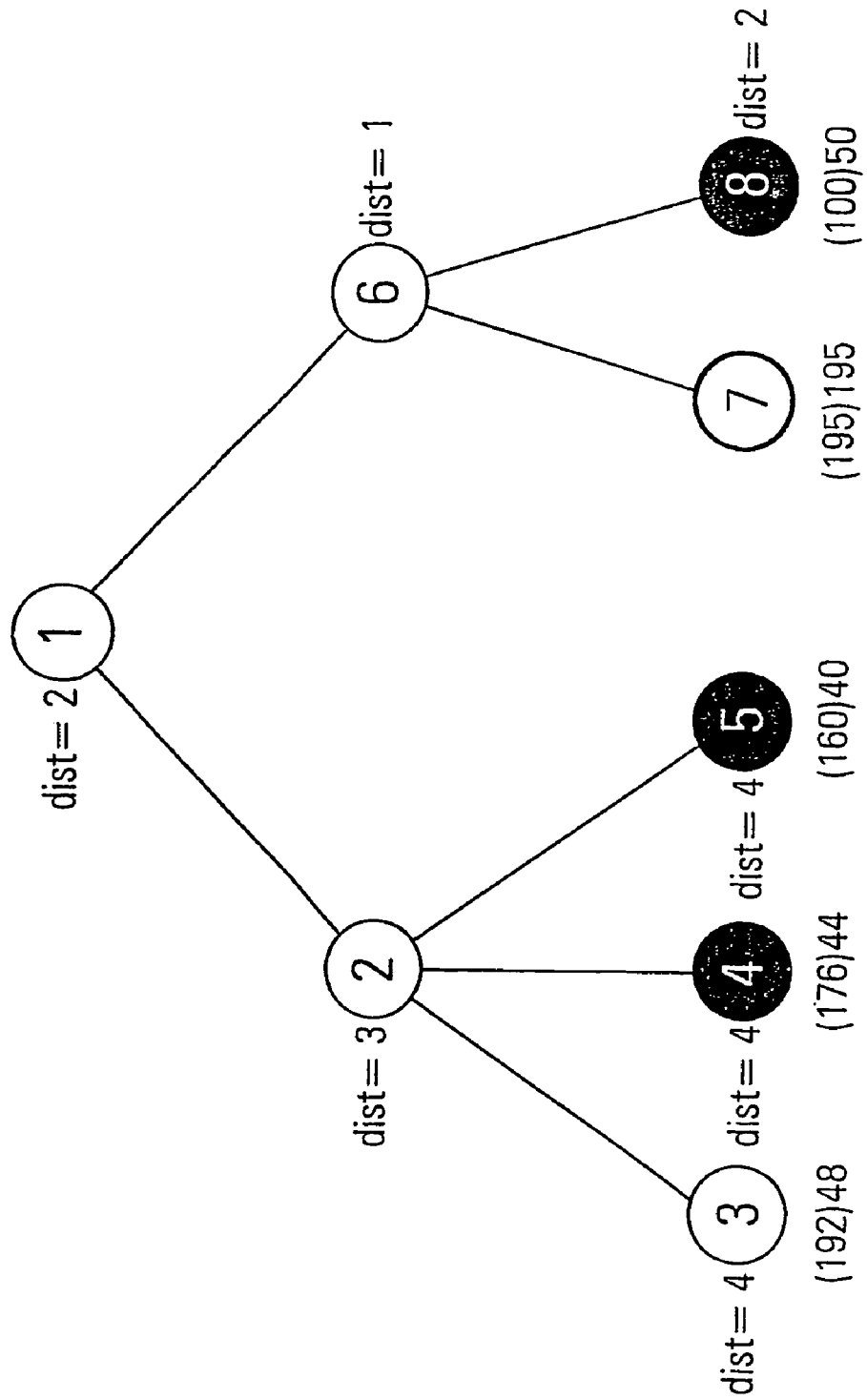
FIG. 9 shows an example for a second de-fragmentation strategy according to the present invention.

Heretofore, FIG. 9 shows an example to illustrate the application of this further de-fragmentation method to a tree modeling the structure of a structured document, where the level of detail is 2, the nodes representing documents for progressive delivery are 3, 4, 5, 7 and 8.

Further, it is assumed that the initial relevance weightings of these nodes are 192, 176, 160, 195 and 100, respectively.

According to the further de-fragmentation strategy it is proposed to select the node with highest relevance weightings, i.e. node 7 with relevance weighting 195, as next node during generation of a de-fragmented transmission sequence.

Then, a distance from this selected node, e.g., node 7, in the sense of a shortest path metric is determined to different nodes in the tree, i.e. a distance 1 to node 6, a distance 2 to node 8, etc.

Then, relevance weightings of the remaining nodes are updated according to the related distance.

The result of this step is shown in tabular form in FIG. 10.

FIG. 10 shows that during each iteration one node is assigned from the transmission sequence D to a de-fragmented transmission sequence D'. The same table also shows that the nodes in the transmission sequence not yet assigned to the de-fragmented transmission sequence D' are sorted according to the values of the relevance weightings after update thereof.

As shown in FIGS. 9 and 10, after assignment of the node 7 to the de-fragmented transmission sequence in a first step, the next node to be selected is node 3, having the highest relevance weighting 48 after division of initial value 192 by the related distance value 4. Therefore, this node 3 will be assigned to the second place of the de-fragmented transmission sequence.

The further lines of the table in FIG. 10 show the recursive application of the de-fragmentation procedure explained above and the final de-fragmented transmission sequence D': 7, 8, 3, 4, 5.

Figure 11:
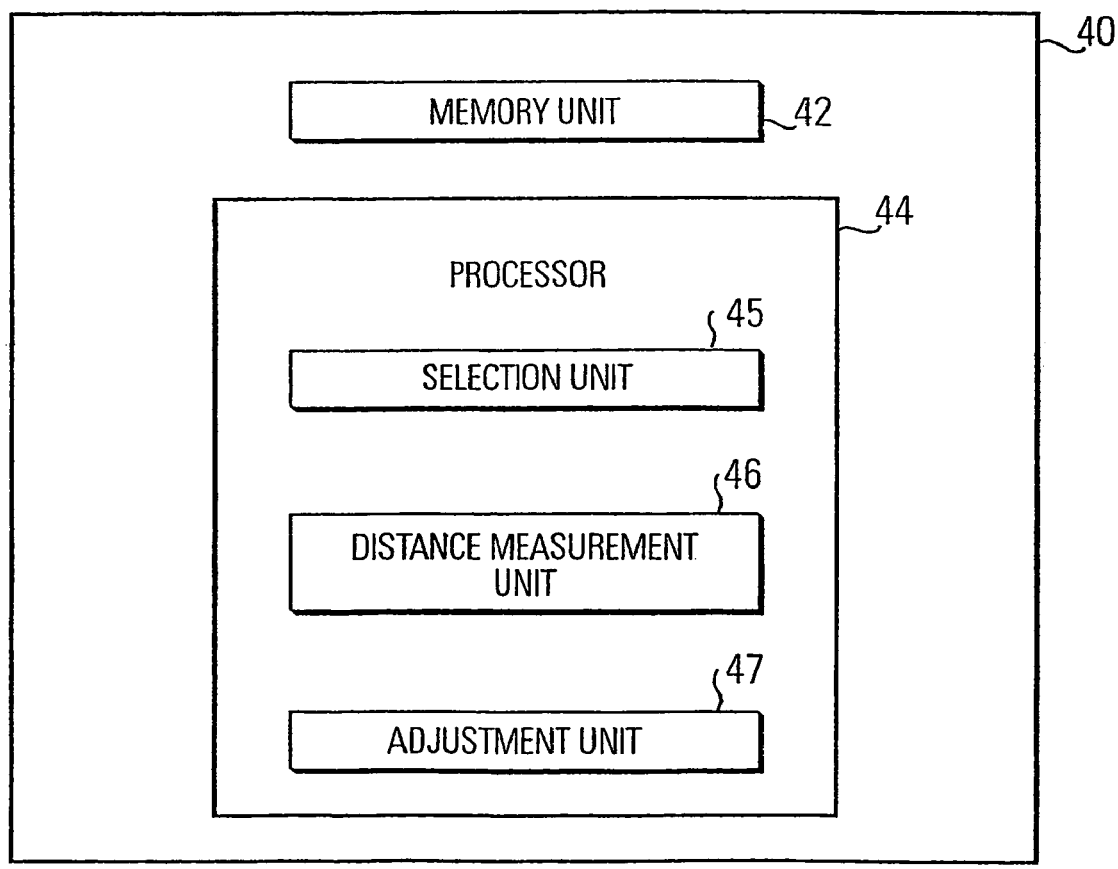
FIG. 11 shows a schematic diagram of a de-fragmentation apparatus according to the present invention.

FIG. 11 shows a schematic diagram of a de-fragmentation apparatus being adapted to carry out the second de-fragmentation method according to the present invention, explained with an example referring to FIGS. 9 and 10.

As shown in FIG. 11, the de-fragmentation apparatus comprises a memory unit 42 and a processing unit 44. The processing unit 44 divides into a selection unit 45, a distance measurement unit 46, and an adjustment unit 47.

Figure 12:
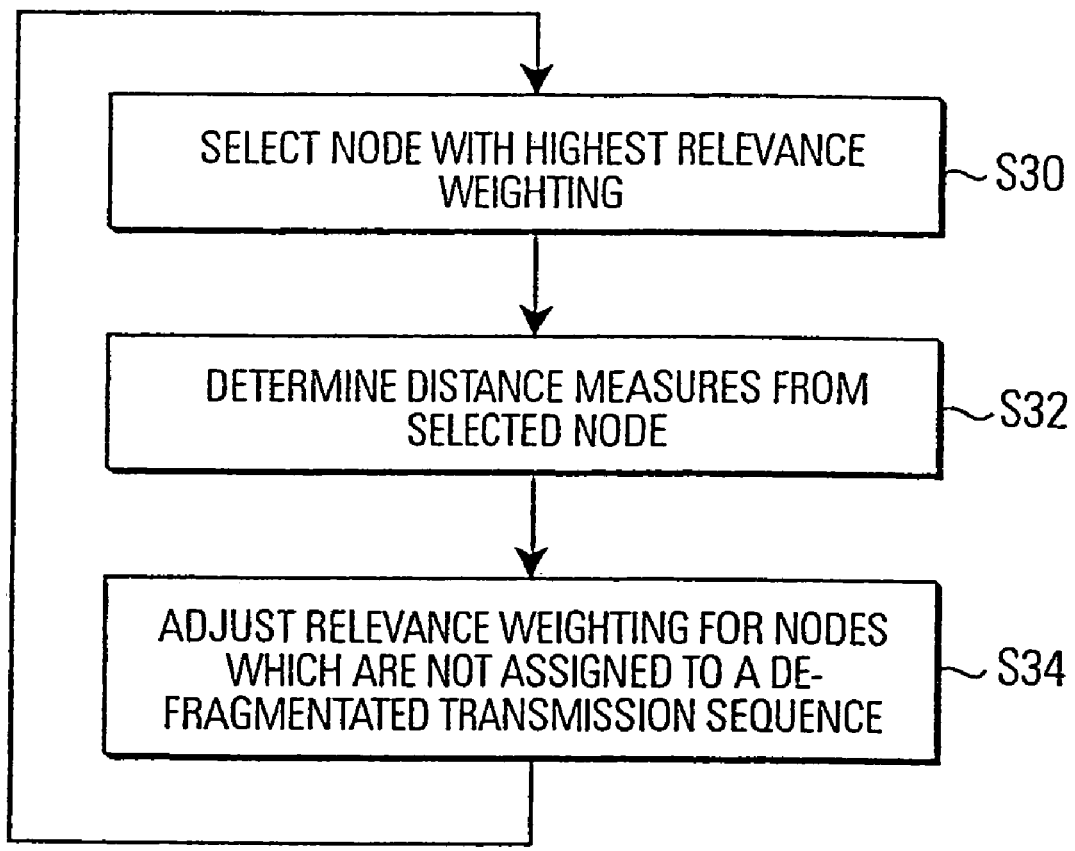
FIG. 12 shows a flowchart for a second de-fragmentation method according to the present invention.

FIG. 12 shows a flowchart for the second de-fragmentation method in compliance with the operation of the de-fragmentation apparatus shown in FIG. 11 and as explained with respect to FIGS. 9 and 10.

As shown in FIG. 12, according to the second de-fragmentation method in a first step S30 there is selected a node with highest relevance weighting. Then, in a second step S32 distance measures are determined from the selected node using the graph modeling of the structured document and shortest path metrics. Then, in a step S34 relevance weightings are adjusted for nodes which are not yet assigned to the de-fragmented transmission sequence. The adjustment is achieved using a function of the related distance measure.

As shown in FIG. 12, steps S30 to S34 are recursively applied until all elements of the progressive transmission sequence are transferred to the de-fragmented transmission sequence.

It should be noted, that according to the present invention there is no particular restriction for the adjustment of relevance weightings in the node.

In the most general sense, it is a decreasing function according to the order of the node being processed, e.g., the node number. Therefore, one implementation would be to divide the relevance weight of a node by the distance to the selected node, as outlined above.

A formal representation of the second de-fragmentation method according to the present invention is given in the following. Here, the procedure S-DISTANCE is recursively applied to a list of nodes of the tree as follows:

```
1.  Procedure S-DISTANCE (D: List(Node))
2.  Begin
3.      first:=head(D); rest:=tail(D);
4.      Foreach (c in rest) do
5.          v(c) := v(c)/dist(c,first);
6.      S-DISTANCE (sort(<=, v, rest));
7.  End
```

In line 5 of the procedure S-DISTANCE the relevance weightings of the nodes not yet assigned to the de-fragmented transmission sequence are updated, as explained above with reference to FIG. 9 to 12 and related embodiments of the present invention. It is should that this is an non-limiting example only and that any type of relevance weighting update is applicable in the procedure S-DISTANCE.

The recursive call of the S-DISTANCE procedure in line 6 uses a sorting procedure providing the list of nodes for subsequent processing with an ascending order of updated relevance weightings. Therefore, the next node to be selected for assignment to the de-fragmented transmission sequence is the head of the list.

Figure 13:
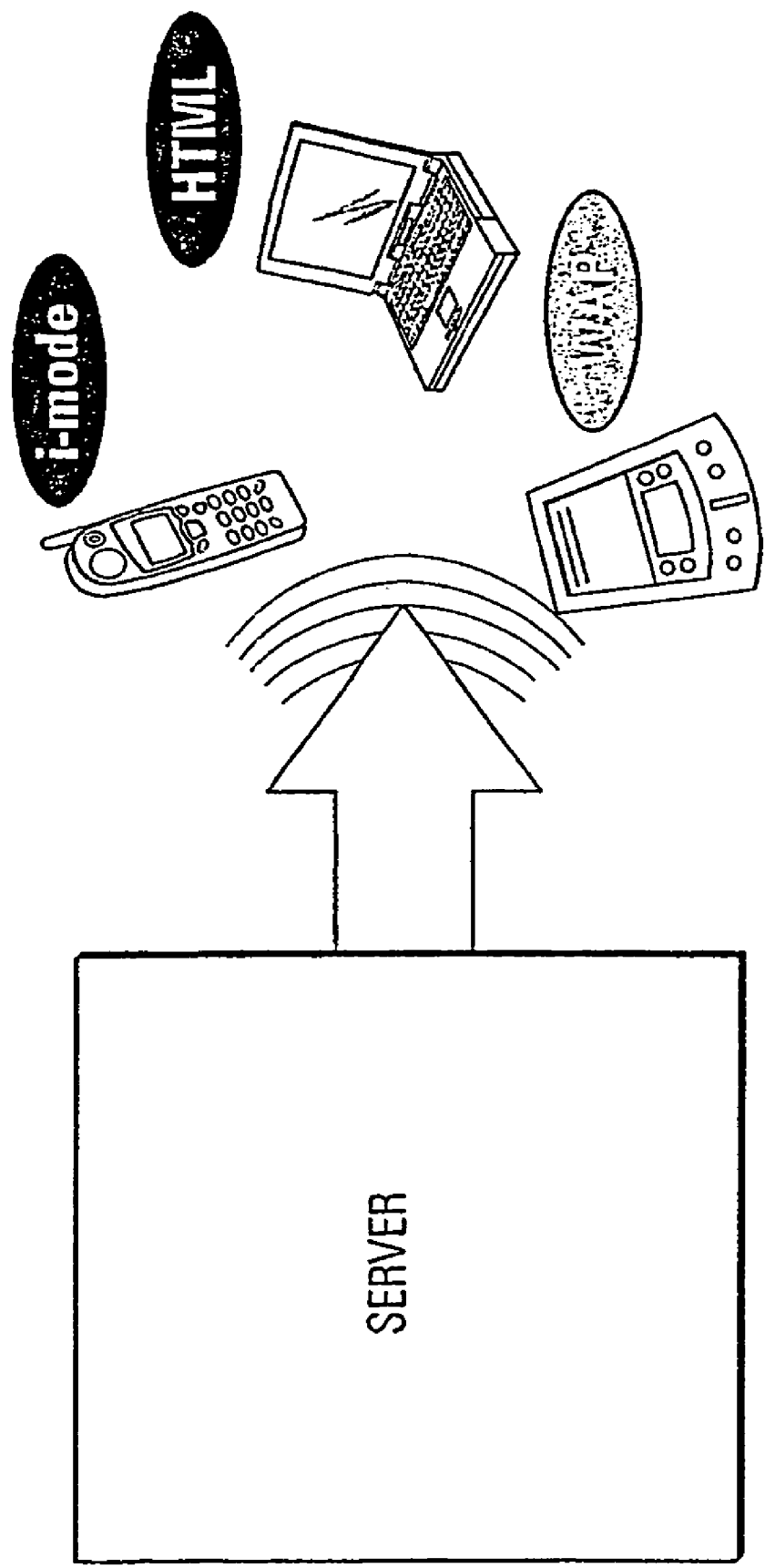
FIG. 13 shows an example of application of the present invention to a client/server environment.

FIG. 13 shows an example of application of the present invention to a client/server environment, in particular being related to mobile communication.

As shown in FIG. 13, progressive transmission as explained above is achieved to a mobile device, e.g., a mobile telephone, a personal digital agent, a portable computer or any type of hybrid device. Although not shown, the present invention may also be applied to a client/server environment in a fixed network.

As shown in FIG. 13, the mobile device may be of any type. Without limiting scope of invention examples are mobile telephones, personal digital assistants PDAs, portable computers or any type of hybrid (not shown).

According to another embodiment of the present invention, progressive transmission is achieved via a connection provided according to a standard selected from a group comprising GSM, PDC, GPRS, PPP, HSCSD, WLAN, HiperLAN, IrDa, Bluetooth, IS 45, IS 95, IMT 2000.

This preferred embodiment of the present invention is particularly suited for mobile communication applications and delivery of structured documents to mobile devices. Here, GSM, PDC, GPRS, PPP, IS 45, HSCSD, are standards underlying the mobile communication. The same applies to IS 95 and IMT 2000 for wideband CDMA.

However, the present invention is as well applicable to wireless local area network applications such as WLAN, HiperLAN.

As shown in FIG. 13, communication between the server and the client is wireless without any restriction on the physical layer, e.g., according to mobile communication standards GSM, PDC, GPRS, PPP, HSCSD, IS 45, IS 95, IMT 2000. Another example would be the application of local network related standards WLAN, HiperLAN, Bluetooth, or infrared transmission using IrDA.

Figure 14:
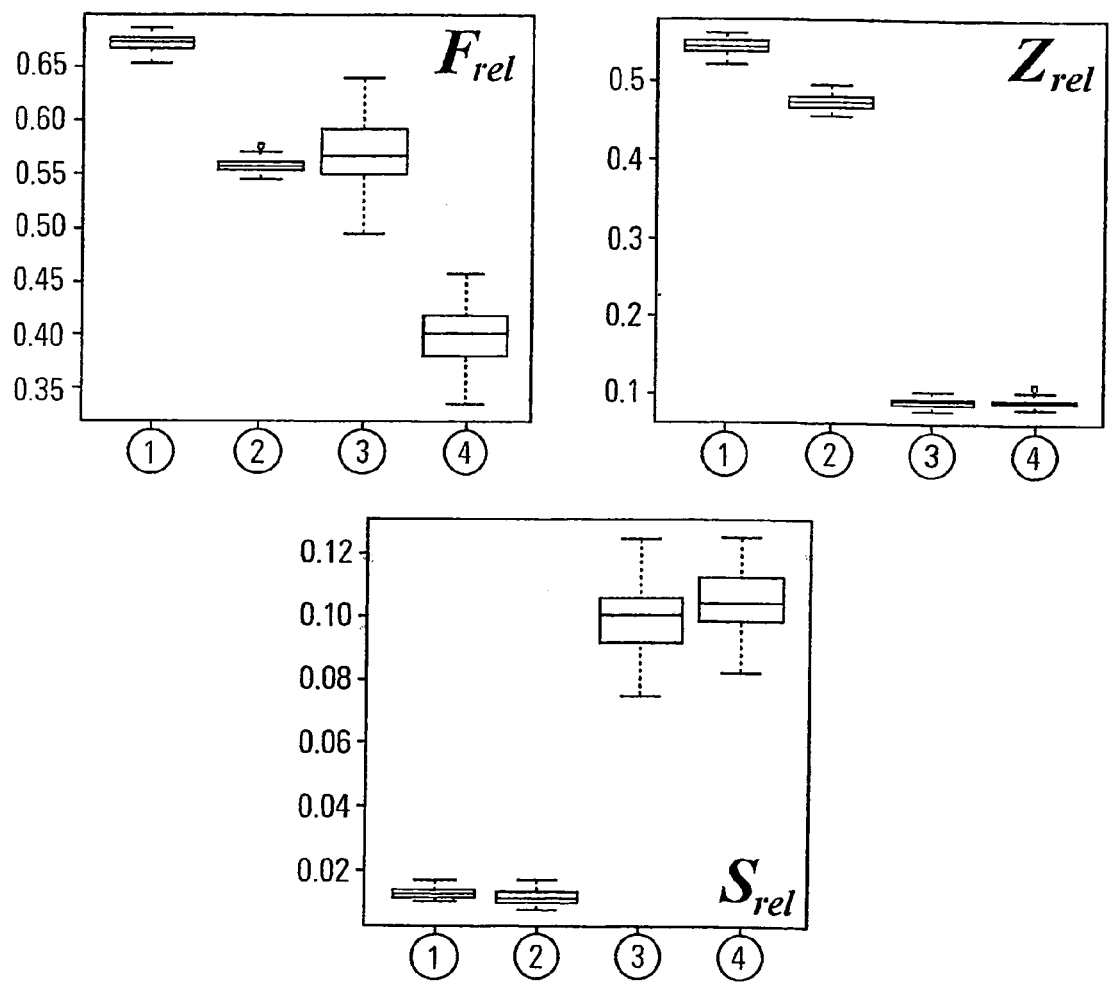
FIG. 14 shows results achieved through application of the present invention.
Figure 15:
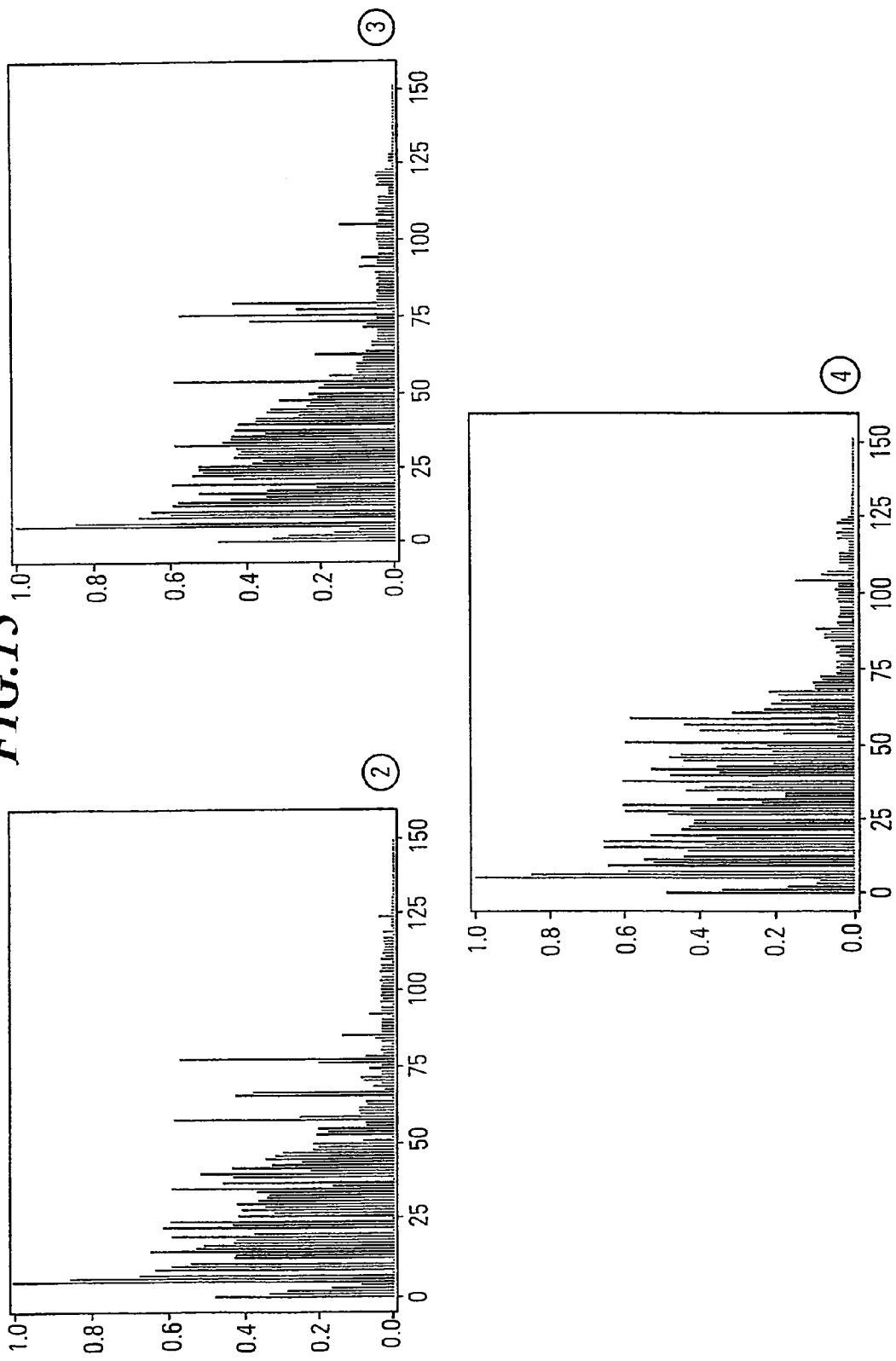
FIG. 15 shows further results achieved through application of the present invention.

FIGS. 14 and 15 shows results achieved although application of the present invention.

In particular, FIG. 14 shows a measurement values for documentation for four cases:

Case 1: document fragmentation after application of relevance weightings to initial transmission sequence without application of de-fragmentation methods according to the present invention;

Case 2: document fragmentation after application of relevance weightings to initial transmission sequence and application of the first de-fragmentation method according to the present invention;

Case 3: document fragmentation after application of relevance weightings to initial transmission sequence and application of the second de-fragmentation method according to the present invention;

Case 4: document fragmentation after application of relevance weightings to initial transmission sequence and application of the first and second de-fragmentation method according to the present invention;

FIG. 14 shows the results achieved for fifty different structured documents. The distribution of measurement values in the different cases and related normalized fragmentation values, i.e. absolute fragmentation measurement values, incoherence fragmentation measurement values, and readability measurement value is respectively shown as line between a lower limit value and an upper limit value. Mean values and variances are illustrated using rectangles, where the middle line corresponds to the mean value, respectively.

As shown in the upper part of FIG. 14, both the application of the first de-fragmentation method and the second de-fragmentation method already allow for a significant improvement of the absolute fragmentation measure and the incoherence fragmentation measure. At the same time, the readability measurement value is improved considerably.

As shown in FIG. 15, the optimization of the different measurement values for document de-fragmentation has only little impact on distributions of relevance weightings after applying the de-fragmentation methods according to the present invention. In other words, sub-documents with high relevance weights are still transmitted first within the progressive transmission method according to the present invention.

The invention claimed is:

1. A method of de-fragmenting a transmission sequence to transmit a structured document prior to transmission of the structured document, the structured document comprising sub-documents with related relevance weightings being modelled as nodes of a graph, the context linkages between different sub-documents being modelled as arcs of the graph, and the transmission sequence being modelled as an ordered set of nodes, comprising the steps:
   selecting the node with highest relevance weighting as next node of a de-fragmented transmission sequence;
   determining a distance measure from the selected node to nodes of the transmission sequence which are not assigned to the de-fragmented transmission sequence using the graph modelling of the structured document and shortest path metrics;
   adjusting relevance weightings for nodes which are not assigned to the de-fragmented transmission sequence as a function of the related distance measure;
   recursively repeating the previous steps until all nodes of the transmission sequence are processed.

2. A method according to claim 1, characterized in that relevance weightings for nodes which are not assigned to the de-fragmented transmission sequence are adjusted in indirect proportion to the related distance measure.

3. A method according to claim 2, characterized in that the relevance weighting for each is adjusted by dividing the relevance weighting of the node through the distance measure to the selected node.

4. A method according to one of the claims 1 to 3, characterized in that the graph is a tree.

5. De-fragmentation apparatus for de-fragmentation of a transmission sequence for a structured document prior to transmission thereof, comprising:
- a memory unit adapted to store a structured document and a model thereof, where sub-documents of the document are stored in relation to nodes of a tree, context linkages between different sub-documents are stored as edges of the tree, and the transmission sequence is stored as an ordered set of nodes on a level of detail of the tree selected for document transmission;
- a processing unit adapted to determine the total number of nodes in the tree, the processing unit having
  - a selection unit adapted to select a node with highest relevance weighting as next node of a de-fragmented transmission sequence, and
  - a distance measurement unit adapted to determine a distance measure from the selected node to nodes of the transmission sequence which are not assigned to the de-fragmented transmission sequence using a graph modeling of the structured document and shortest path metrics; and
  - a de-fragmentation unit adapted to adjust the relevance weighting for each node on the level of detail as a function of a node number.

6. De-fragmentation apparatus according to claim 5, characterized in that the processing unit is adapted to traverse the tree in prefix order and to store a node number for each node in the tree in the memory unit.

7. De-fragmentation apparatus method according to claim 6, characterized in that processing unit is adapted to adjust the relevance weighting for each node in the memory unit when traversing the tree in prefix order.

8. De-fragmentation apparatus method according to one of the claims 5 to 7, characterized in that the processing unit is adapted to adjust relevance weightings for nodes in the memory unit in indirect proportion to the number of the node.

9. De-fragmentation apparatus method according to 7, characterized in that the processing unit is adapted to adjust the relevance weighting for each node in the memory unit with a factor defined to total number of nodes in the tree divided by number of the node.

10. A de-fragmentation apparatus for de-fragmentation of a transmission sequence of a structured document prior to transmission thereof, comprising:
- a memory unit adapted to store a model of the structured document, where sub-documents of the document and related relevance weightings are stored as nodes of a graph, context linkages between different sub-documents are stored as arcs of the graph, and the transmission sequence is stored as an ordered set of nodes;
- a processing unit having
  - a selection unit adapted to select a node with highest relevance weighting as next node of a de-fragmented transmission sequence;
  - a distance measurement unit adapted to determine a distance measure from the selected node to nodes of the transmission sequence which are not assigned to the de-fragmented transmission sequence using the graph modelling of the structured document and shortest path metrics;
  - an de-fragmentation unit adapted to adjusting relevance weightings for nodes which are not assigned to the de-fragmented transmission sequence as a function of the related distance measure; wherein
- the processing unit is adapted recursively activate the selection unit, the distance measurement unit, and the de-fragmentation unit until all nodes of the transmission sequence are processed.

11. A de-fragmentation apparatus according to claim 10, characterized in that the de-fragmentation unit is adapted to adjust relevance weightings for nodes which are not assigned to the de-fragmented transmission sequence in indirect proportion to the related distance measure.

12. A de-fragmentation apparatus according to claim 10, characterized in that the de-fragmentation unit is adapted to adjust relevance weightings for nodes which are not assigned to the de-fragmented transmission sequence by dividing the relevance weighting of the node with the distance measure to the selected node.

* * * * *